(12) United States Patent
Ma et al.

(10) Patent No.: US 9,703,131 B2
(45) Date of Patent: Jul. 11, 2017

(54) LIQUID CRYSTAL MOTHERBOARD, MANUFACTURING AND CUTTING METHODS THEREOF, AND LIQUID CRYSTAL PANEL OBTAINED THEREBY

(71) Applicant: SHENZHEN CHINA STAR OPTOELECTRONICS TECHNOLOGY CO., LTD., Shenzhen, Guangdong (CN)

(72) Inventors: Tao Ma, Shenzhen (CN); Tao Song, Shenzhen (CN); Ming Liu, Shenzhen (CN); Guodong Zhao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/240,350

(22) PCT Filed: Jan. 22, 2014

(86) PCT No.: PCT/CN2014/071053
§ 371 (c)(1),
(2) Date: Feb. 21, 2014

(87) PCT Pub. No.: WO2015/018190
PCT Pub. Date: Feb. 12, 2015

(65) Prior Publication Data
US 2015/0146154 A1    May 28, 2015

(30) Foreign Application Priority Data

Aug. 9, 2013  (CN) .......................... 2013 1 0347029

(51) Int. Cl.
 G02F 1/1339 (2006.01)
 G02F 1/1333 (2006.01)
 C03B 33/07 (2006.01)

(52) U.S. Cl.
 CPC .......... *G02F 1/1333* (2013.01); *C03B 33/076* (2013.01); *G02F 1/133305* (2013.01);
 (Continued)

(58) Field of Classification Search
 CPC ........................ G02F 1/133351; G02F 1/1339
 (Continued)

(56) References Cited

U.S. PATENT DOCUMENTS

2003/0025868 A1* 2/2003 Hiroshima .......... G02F 1/13394
                                                        349/156
2004/0080703 A1* 4/2004 Lai ........................ G02F 1/1339
                                                        349/153

(Continued)

FOREIGN PATENT DOCUMENTS

CN        1624548 A      6/2005
CN      101424826 A      5/2009
(Continued)

OTHER PUBLICATIONS

International Search Report dated May 13, 2014.

*Primary Examiner* — Thanh-Nhan P Nguyen
(74) *Attorney, Agent, or Firm* — Stein IP, LLC

(57) ABSTRACT

The present disclosure provides a method for manufacturing a liquid crystal panel motherboard, comprising providing materials that can form projections on a margin area of at least one of two substrates of the liquid crystal panel motherboard, and then fitting said two substrates to each other, so that the margin area of said at least one of the two substrates cannot be fit to a corresponding margin area of the other substrate seamlessly. The present disclosure also pro- (Continued)

vides a method for cutting a liquid crystal panel motherboard, and a liquid crystal panel obtained from the liquid crystal motherboard.

6 Claims, 2 Drawing Sheets

(52) U.S. Cl.
CPC ............... *G02F 1/133351* (2013.01); *G02F 2001/133354* (2013.01); *Y10T 225/12* (2015.04)

(58) Field of Classification Search
USPC ........................................ 349/158, 153, 190
See application file for complete search history.

(56) References Cited

U.S. PATENT DOCUMENTS

| | | | | |
|---|---|---|---|---|
| 2008/0129946 | A1* | 6/2008 | Chan | G02F 1/1339 349/153 |
| 2010/0118227 | A1* | 5/2010 | Shibata | G02B 3/005 349/58 |
| 2012/0133874 | A1* | 5/2012 | Hoshina | G02F 1/1339 349/138 |

FOREIGN PATENT DOCUMENTS

| | | |
|---|---|---|
| CN | 102749731 A | 10/2012 |
| CN | 102929024 A | 2/2013 |
| CN | 103439820 A | 12/2013 |
| JP | 2002031806 A | 1/2002 |
| JP | 200815383 A | 1/2008 |
| WO | WO 2015/018190 A1 | 2/2015 |

\* cited by examiner

LIQUID CRYSTAL MOTHERBOARD, MANUFACTURING AND CUTTING METHODS THEREOF, AND LIQUID CRYSTAL PANEL OBTAINED THEREBY

FIELD OF THE INVENTION

The present disclosure relates to a field of manufacturing a liquid crystal panel, particularly to a liquid crystal motherboard, manufacturing and cutting methods thereof, and a liquid crystal panel obtained thereby.

BACKGROUND OF THE INVENTION

High vertical alignment (HVA), e.g., polymer stabilized vertical alignment (PSVA) is currently one of the mainstream techniques in the display panel industry (mainly including thin film transistor liquid crystal display (TFT-LCD), organic light emitting diode (OLED), and the like). This technique mainly takes advantage of the polymerization of macromolecules in liquid crystals under the combined action of ultraviolet and voltage, whereby automatic alignment of liquid crystals can be realized. Thus, when ultraviolet illuminates the liquid crystal panel, it is necessary to apply a certain amount of voltage to the liquid crystal panel, both ends of the liquid crystal, and both sides of the thin film transistor (TFT) and the color film (CF).

For this purpose, in the conventional method at present, some metal electric circuits are provided in a margin area of the TFT substrate. Through these metal electric circuits, external voltage can be transmitted into the liquid crystal panel. However, the liquid crystal panel at present is generally composed of two substrates, one above and one below, such as a CF substrate and a TFT substrate. In this case, a portion of the CF substrate will block the metal electric circuits at the TFT substrate so that the external voltage cannot be applied thereto. Consequently, this portion of the CF substrate is required to be cut off.

Currently, a single cutting machine is mainly used for cutting off said portion of the CF substrate in the industry, which is described as follows. In this method, the margin areas at two opposite sides (which may be one to four sides dependent on the design) of the liquid crystal panel motherboard are cut off by the single cutting machine, and metal wires of the TFT substrate to receive external voltage are exposed, so that external voltage can be applied thereto. Presently, the cutting-off process is usually divided into three steps, i.e. cutting, splintering and removing of end material. Cutting is to generate a crack of a certain depth on the surface of glass substrate. Splintering is to expand the crack generated under the action of force in order to achieve a smooth separation of the end material of glass. Then, vacuum absorption is used to hold the end material, which are subsequently removed from the TFT substrate and thus the metal electric circuits of the TFT substrate can be exposed, so that external voltage can be applied to them readily.

During removing the end material, sometimes it is difficult to split the end material from the TFT substrate. The wider the end material to be detached is, the harder the detachment will be, and the more likely the removal will fail. Investigations indicate that the reason could be as follows. The end material that needs to be detached is at one of two pieces of glass, while the other piece of glass does not need to be detached. Normally, the surfaces of the end material and the other piece of glass are both quite flat, and the two pieces of glass are fit to each other tightly after a force is applied thereon, with no air left between the two pieces of glass. Thus a vacuum environment is formed therebetween. Therefore, it is very difficult to remove one of the two pieces of glass under the external atmospheric pressure. In the meantime, the wider the end material, the more difficult the detachment is, and the higher the possibility of failure of the detachment is.

SUMMARY OF THE INVENTION

To solve the above technical problems in the prior art, the object of the present disclosure is to provide a liquid crystal panel motherboard, a liquid crystal panel, and a manufacturing and cutting method thereof. The present disclosure provides a solution to the problem that TFT (or CF) residue materials formed after cutting the TFT or CF substrate cannot be detached from the TFT or CF substrate in the conventional manufacturing process of HVA one-time cutting, which is due to the vacuum environment generated as a result of a seamless fitting of the margin areas of the TFT and CF substrates because of smooth glass surfaces thereof.

The present disclosure provides the following technical solutions.

1) A liquid crystal motherboard, comprising two substrates which are fit to each other, wherein projections are arranged on a margin area other than a display area of one or two of the substrates, so that the margin area of a substrate cannot be fit to a corresponding margin area of the other substrate seamlessly when said two substrates are fit to each other.

2) In one preferred embodiment of the liquid crystal panel motherboard according to technical solution 1) of the present disclosure, said projections are a plurality of projecting strips which are parallel to and space from each other.

3) In one preferred embodiment of the liquid crystal panel motherboard according to technical solution 2) of the present disclosure, said projecting strips are continuous or discrete projecting strips.

4) In one preferred embodiment of the liquid crystal panel motherboard according to technical solution 2) of the present disclosure, the projection has a height in the range from 0.1 to 1.3 µm.

5) In one preferred embodiment of the liquid crystal panel motherboard according to technical solution 2) of the present disclosure, the projection has a height of 0.13 µm.

6) In one preferred embodiment of the liquid crystal panel motherboard according to any one of technical solutions 1) to 5) of the present disclosure, both substrates are provided with the projections, which are distributed with the same shape and pattern at the same positions on the two substrates respectively.

7) In one preferred embodiment of the liquid crystal panel motherboard according to any one of technical solutions 1) to 6) of the present disclosure, said projection is made of polyimide film. In the present disclosure, polyimide can be coated on the corresponding margin area(s) of at least one of said two substrates by means of a coater or an inkjet printer, in order to form the projecting strips on the area(s).

8) A method for manufacturing the liquid crystal panel motherboard according to any one of technical solutions 1) to 7), comprising providing materials that can form projections on a margin area of at least one of the two substrates before fitting said two substrates to each other, so that corresponding margin areas of said two substrates cannot be fit to each other seamlessly.

9) A method for cutting the liquid crystal panel motherboard according to any one of technical solutions 1) to 7), comprising: generating a crack in a region between a display area and a margin area of the substrate of the liquid crystal panel motherboard with no electric circuits provided thereon by means of cutting; applying a force to expand said crack so that the margin area can be separated from the display area; and removing the separated margin area from the liquid crystal panel motherboard so as to expose electric circuits of the liquid crystal panel motherboard for further processing.

10) A liquid crystal panel, a margin area other than a display area of at least one of said panel comprising projections with which residual material areas of the two substrates cannot be fit to each other seamlessly when said two substrates are fit to each other.

According to the present disclosure, when two substrates are fit to each other to form the cell from the liquid crystal panel motherboard, no vacuum seamless fitting at the margin areas can be obtained. Therefore, the margin area of the substrate can be easily cut off. Without being bound by theory, the advantages may be resulted from the following reasons. Take polyimide film (PI film, also known as alignment film) as an example. PI film is formed after solidification of alignment liquid which is spread on the TFT and CF substrates in advance for pre-alignment of liquid crystals. In the prior art, PI film is formed merely within the display area of a substrate, but not in the margin area of the substrate. According to the present disclosure, through altering formulation and process of PI coating, PI lines are further coated in the margin area outside the display area of the substrate besides the display area as usual during coating the PI film on the TFT and CF substrates. Subsequently, the alignment liquid in the margin area and the display area solidify simultaneously. According to the disclosure, the margin areas of both substrates or the margin area of one substrate can be coated.

The height of PI film can be selected in the range from 0.1 to 1.3 µm, while the space between said two substrates in the liquid crystal display panel after being fit to each other is in the range from 1.5 to 4.0 µm. Therefore, when only one substrate is coated with PI lines, smooth contact between two substrates at a region outside the display area can be effectively prevented, whereby no vacuum seamless fitting can be formed. Therefore, the requirement for separating margin areas in the manufacturing process can be met. In addition, when PI lines are provided at the margin areas of both substrates outside the display areas thereof, the PI lines can further function as a support, thus rendering the one-time cutting procedure easier and more convenient.

The projections of the present disclosure can be formed by spacers, photoresist materials, and the like. When spacers are used, said spacers can, as projections, be scattered directly on said margin areas. When photoresist materials are used, photoresist agent should be spread on the margin areas first, and then an exposure treatment should be performed to obtain said projections.

The beneficial effects obtained according to the present disclosure include the following. The method according to the present disclosure is simple and easy to perform, and provides a solution to the problem of cutting difficulty in the prior art due to seamless fitting between two substrates after the substrates are joined.

LIST OF REFERENCE SIGNS 1 first substrate;
2 second substrate;
3 first margin area;
4 first sealing member;
6 first margin cutting line;
7 display area;
1' third substrate;
2' fourth substrate;
3' second margin area;
4' second sealing member;
5' projecting strip;
6' second margin cutting line; and
7' display area.

DETAILED DESCRIPTION OF THE EMBODIMENTS

Below, the present disclosure will be discussed in detail with reference to the drawings and examples. However, it should be understood that the scope of the present disclosure is not limited to the examples below; it is intended to cover alternatives, various modifications and equivalents within the scope and spirit of the present disclosure. In particular, as long as there is no structural conflict, the technical features mentioned in each of the examples can be combined in any way.

EXAMPLE 1

Figure 1:
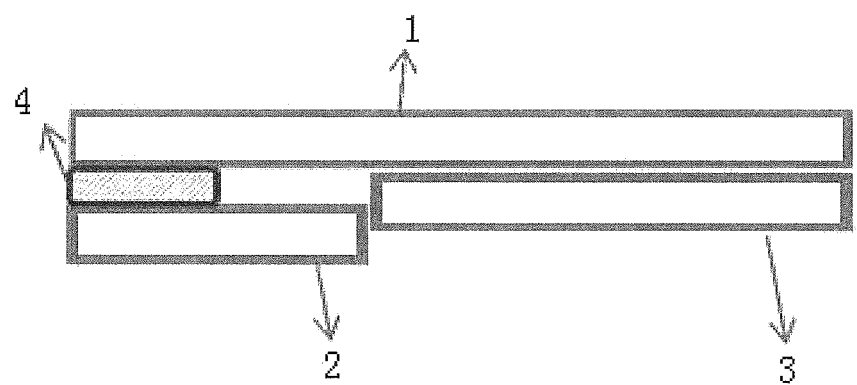
FIG. 1 schematically shows a cross-sectional view of a liquid crystal panel motherboard before margin areas thereof are cut off according to the method in the prior art.
Figure 2:
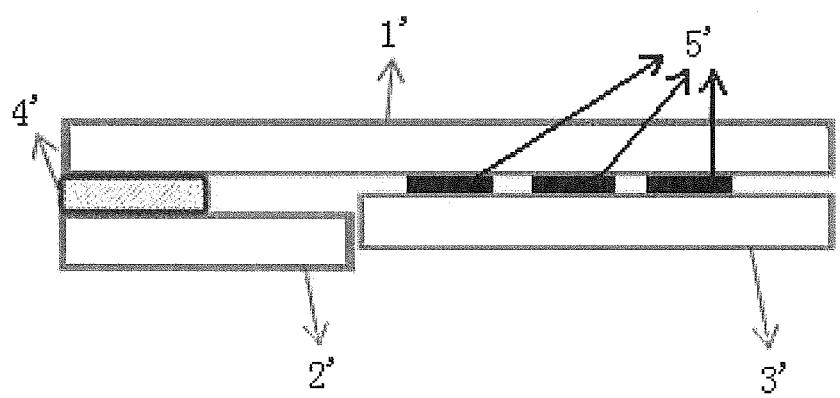
FIG. 2 schematically shows a cross-sectional view of a liquid crystal panel motherboard before margin areas thereof are cut off according to the method of the present disclosure.
Figure 3A:
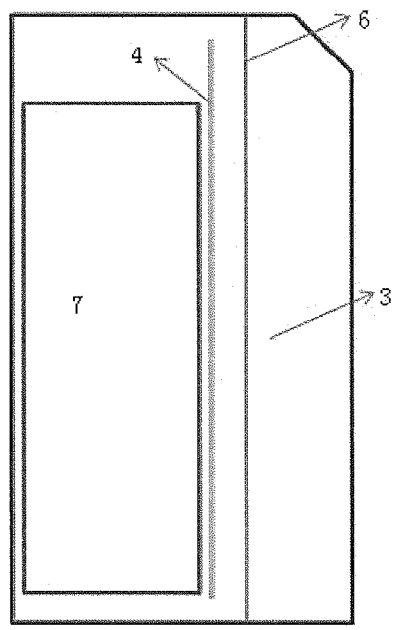
FIGS. 3a and 3b show one of the two substrates in the liquid crystal panel motherboards formed by the method in the prior art and that of the present disclosure, respectively.
Figure 3B:
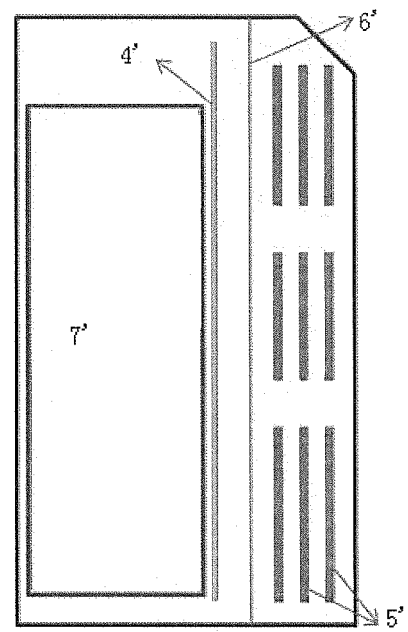
Figure 4:
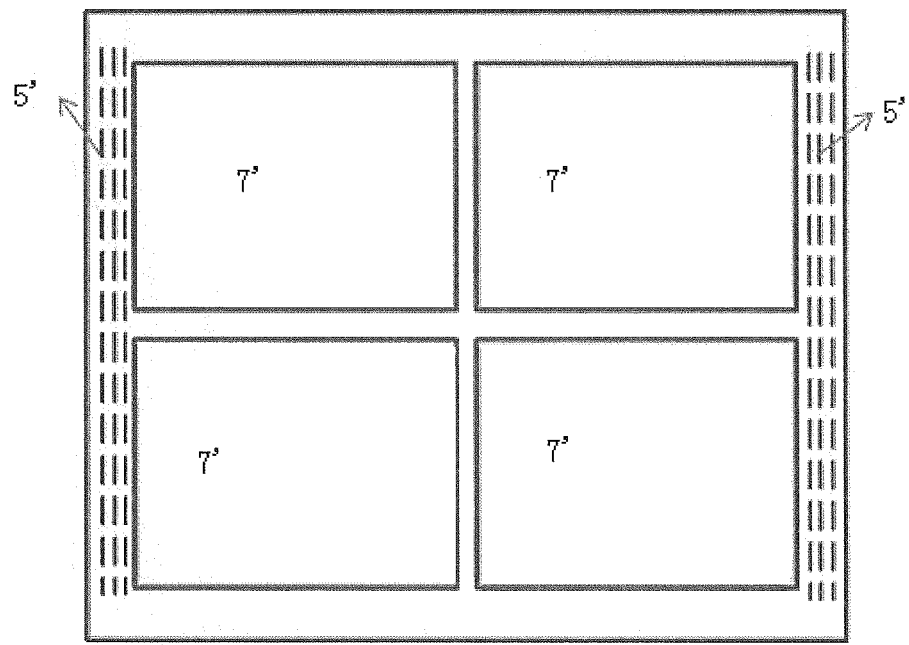
FIG. 4 shows a schematic view of one of the substrates of the liquid crystal panel motherboard formed by the method according to one preferred embodiment of the present disclosure.

The liquid crystal panel motherboard formed by the method of the present example is shown in FIGS. 2, 3b, and 4.

The liquid crystal panel motherboard of the present disclosure comprises two substrates, i.e., a third substrate 1' and a fourth substrate 2'. Said third substrate 1' is generally a thin-film transistor (TFT) substrate, which is mainly provided with driving circuits and the like thereon. Said fourth substrate 2' is generally a color film (CF) substrate. Said liquid crystal panel motherboard further comprises a second margin area 3', which is located on a margin portion of the fourth substrate 2' (i.e. the CF substrate) that can be fit to a corresponding margin area of the third substrate 1' (i.e., the TFT substrate). According to the example, three projecting strips 5' are arranged between said second margin area of the CF substrate and the corresponding margin area of the TFT substrate, so that the margin areas of said two substrates cannot be fit to each other seamlessly.

Moreover, as shown in FIG. 3b, a plurality of groups of said projecting strips 5' can be provided on the CF substrate, with each group consisting of three or more projecting strips that are parallel to and spaced from each other. As is further illustrated in FIG. 4, for the whole liquid crystal panel motherboard, said projecting strips can be arranged at each of four margin areas, or some of the four margin areas of said liquid crystal panel motherboard, so as to prevent said margin areas with projecting strips from being fit to the corresponding margin areas seamlessly. Therefore, the subsequent cutting step can be facilitated.

Said projecting strips can be provided as follows. In each or some of the margin areas of the third substrate 1' and fourth substrate 2', polyimide (PI) is coated on the corresponding margin area(s) of at least one of said two substrates by means of a coater or an inkjet printer, in order to form the projecting strips 5' on the area(s). After the PI film is solidified, during forming the liquid crystal cell from the liquid crystal panel motherboard in which two substrates are fit to each other, corresponding margin areas of said two substrates cannot be fit to each other seamlessly.

When the above liquid crystal panel motherboard is cut, firstly a crack is generated on the substrate of the liquid crystal panel motherboard with no electric circuits provided thereon, i.e., the CF substrate, by means of cutting. Then, a force is applied on said crack to expand said crack, so that the margin area of the CF substrate is separated from the display area thereof. Finally, the separated margin area is removed to obtain a liquid crystal panel motherboard with electric circuits exposed, which is transferred to the next step.

The margin area of the substrate of the liquid crystal panel obtained by cutting said liquid crystal panel motherboard still includes said projecting strips 5' formed by PI film.

EXAMPLE 2

The liquid crystal panel motherboard formed by the method of this example is shown in FIGS. 2, 3*b*, and 4.

The liquid crystal panel motherboard of the present disclosure comprises two substrates, i.e., a third substrate 1' and a fourth substrate 2'. Said third substrate 1' is generally a thin-film transistor (TFT) substrate, which is mainly provided with driving circuits and the like thereon. Said fourth substrate 2' is generally a color film (CF) substrate. Said liquid crystal panel further comprises a second margin area 3', which is located on a margin portion of the fourth substrate 2' (i.e. the CF substrate) that can be fit to a corresponding margin area of the third substrate 1' (i.e., the TFT substrate). According to the example, spacers are provided (e.g., spread) as projections between said second margin area of the CF substrate and the corresponding margin area of the TFT substrate, so that the margin areas of said two substrates cannot be fit to each other seamlessly. The spacers can be placed at the same positions as the projecting strips 5' in Example 1.

When the above liquid crystal panel motherboard is cut, firstly a crack is generated on the substrate of the liquid crystal panel motherboard with no electric circuits provided thereon, i.e., the CF substrate, by means of cutting. Then, a force is applied on said crack to expand said crack, so that the margin area of the CF substrate is separated from the display area thereof. Finally, the separated margin area is removed so as to obtain a liquid crystal panel motherboard with electric circuits exposed, which is transferred to the next step.

The margin area on the substrate of the liquid crystal panel obtained by cutting said liquid crystal panel motherboard still includes said spacers in form of projections.

Compared with Example 1 in which PI film is coated, providing spacers in Example 2 may suffer the difficulty in control of positions of spacers being spread. Thus the display effect and quality of the panel according to Example 2 may be relatively unstable compared to those of the panel according to Example 1. Moreover, the cost for manufacturing the panel according to Example 2 is also relatively higher than that according to Example 1.

EXAMPLE 3

The liquid crystal panel motherboard formed by the method of this example is shown in FIGS. 2, 3*b*, and 4.

The liquid crystal panel motherboard of the present disclosure comprises two substrates, i.e., a third substrate 1' and a fourth substrate 2'. Said third substrate 1' is generally a thin-film transistor (TFT) substrate, which is mainly provided with driving circuits and the like. Said fourth substrate 2' is generally a color film (CF) substrate. Said liquid crystal panel further comprises a second margin area 3', which is located on a margin portion of the fourth substrate 2' (i.e. the CF substrate) that can be fit to a corresponding margin area of the third substrate 1' (i.e., the TFT substrate). According to the example, photoresist projections are provided between said second margin area of the CF substrate and the corresponding margin area of the TFT substrate, so that the margin areas of said two substrates cannot be fit to each other seamlessly. The photoresist projections can be placed at the same positions as the projecting strips 5' in Example 1.

Said photoresist projections can be provided as follows. In each or some of the margin areas of the TFT substrate and the CF substrate, photoresist agent is coated on the corresponding margin area(s) of at least one of said two substrates. Then, the substrate with photoresist agent is exposed by means of exposure treatment so as to form photoresist projections thereon. During forming the liquid crystal cell from the liquid crystal panel motherboard in which two substrates are fit to each other, corresponding margin areas of said two substrates cannot be fit to each other seamlessly.

When the above liquid crystal panel motherboard is cut, firstly a crack is generated on the substrate of the liquid crystal panel motherboard with no electric circuits provided thereon, i.e., the CF substrate, by means of cutting. Then, a force is applied on said crack to expand said crack, so that the margin area of the CF substrate is separated from the display area thereof. Finally, the separated margin area is removed so as to obtain a liquid crystal panel motherboard with electric circuits exposed, which is transferred to the next step.

The margin area on the substrate of the liquid crystal panel obtained by cutting said liquid crystal panel motherboard still includes said photoresist projections.

In this example, exposure treatment is necessary in view of use of photoresist material as projections. Therefore, compared to Example 1 in which PI film is used, this example may result in a relatively complex manufacturing process and a relatively high cost.

The invention claimed is:

1. A method for manufacturing a liquid crystal panel motherboard, comprising providing materials that can form projections on a margin area of at least one of two substrates of the liquid crystal panel motherboard, and then fitting said two substrates to each other, so that the margin area of said at least one of the two substrates cannot be fit to a corresponding margin area of the other substrate seamlessly, wherein said projections are a plurality of projecting strips inside one liquid crystal panel which are parallel to and spaced from each other, and said projecting strips are discrete projecting strips, wherein both substrates are provided with the projections, which are distributed with the same shape and pattern at the same positions on the two substrates respectively, and said projection has a height in the range from 0.1 to 1.3 μm.

2. The method according to claim 1, wherein said projection has a height of 0.13 μm.

3. The method according to claim 1, wherein said projection is made of polyimide film.

4. A liquid crystal panel, comprising two substrates which are fit to each other, wherein projections are arranged on a margin area other than a display area of one or two of the substrates, so that the margin area of a substrate cannot be fit to a corresponding margin area of the other substrate seamlessly when said two substrates are fit to each other, wherein said projections are a plurality of projecting strips inside one liquid crystal panel which are parallel to and spaced from each other, and said projecting strips are discrete projecting strips, wherein both substrates are provided with the projections, which are distributed with the same shape and pattern at the same positions on the two substrates respectively, and said projection has a height in the range from 0.1 to 1.3 μm.

5. The liquid crystal panel according to claim 4, wherein said projection has a height of 0.13 μm.

6. The liquid crystal panel according to claim 4, wherein said projection is made of polyimide film.

\* \* \* \* \*